June 28, 1960  LE ROI E. HUTCHINGS  2,942,411
APPARATUS FOR THE UTILIZATION OF SOLAR ENERGY
Filed July 25, 1957
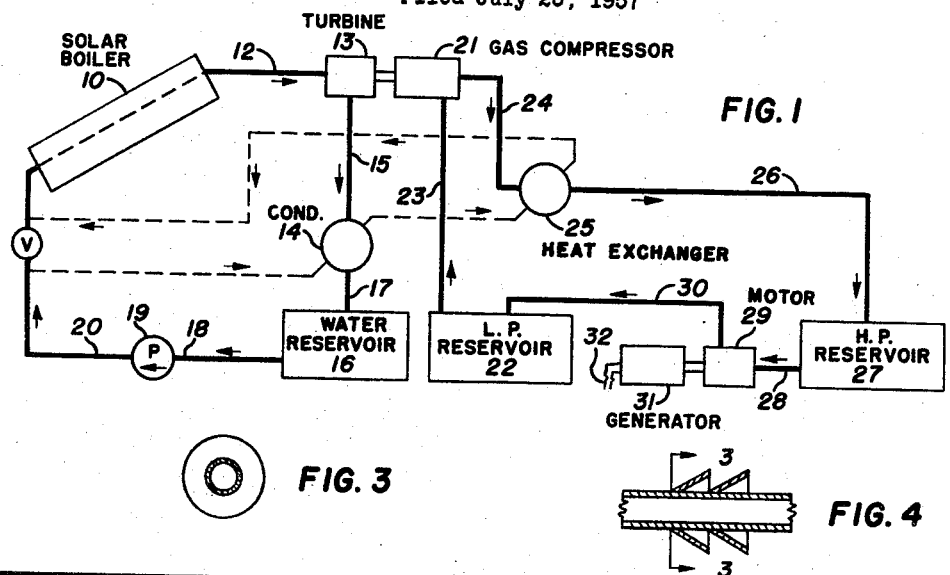
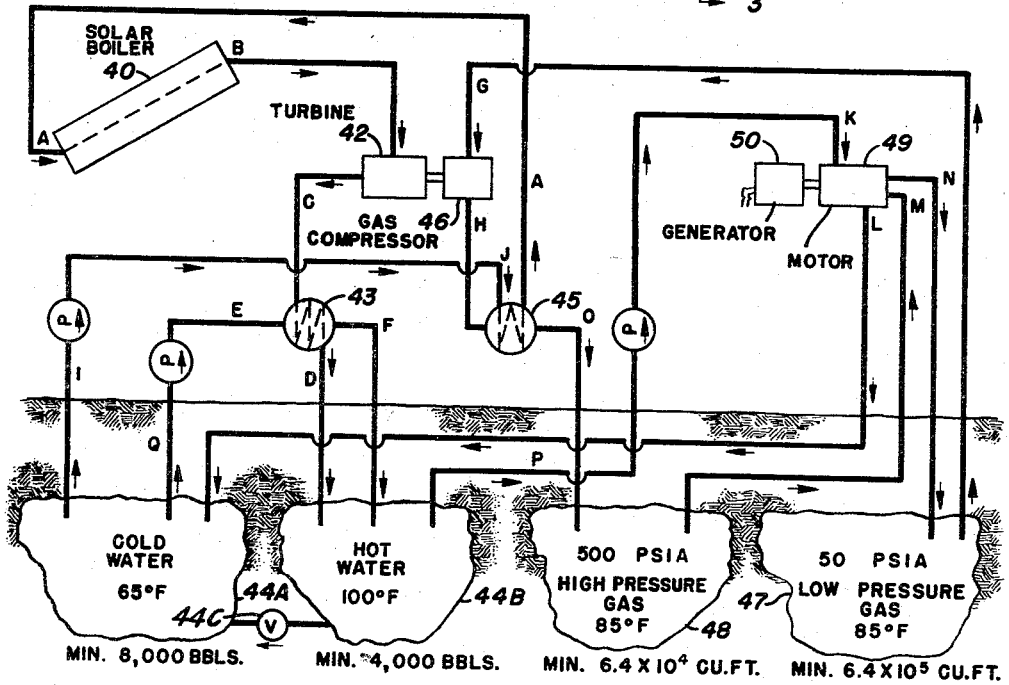
INVENTOR.
LEROI E. HUTCHINGS
BY
ATTORNEY

United States Patent Office

2,942,411
Patented June 28, 1960

2,942,411
APPARATUS FOR THE UTILIZATION OF SOLAR ENERGY

Le Roi E. Hutchings, Crystal Lake, Ill., assignor to The Pure Oil Company, Chicago, Ill., a corporation of Ohio Filed July 25, 1957, Ser. No. 674,179

3 Claims. (Cl. 60—26)

This invention relates to the generation of power. It is more specifically concerned with the utilization of solar energy.

According to the instant invention, solar energy is converted into potential energy in the form of compressed gas, a portion of which is stored for use during the intermittent periods when the solar energy is not available. The compressed gas is employed to operate an "air motor," or other similar expansive-working air-engine type of prime mover, in the generation of electrical power or other forms of work.

The practical utilization of solar energy for domestic and industrial applications has been a problem which has long interested scientists and engineers. With ever-increasing demands on the conventional, non-replaceable, fossil fuels, such as coal, natural and manufactured gases, petroleum products, etc., the need for a supplemental fuel source becomes more important. Because there is available an abundant supply which exceeds the need, and there are absent a number of disadvantages which accompany the use of nuclear or atomic energy, solar energy has an important place in the investigation of new sources of power. Continuous direct utilization of solar energy is handicapped because of the intermittent nature of the solar cycle in its relationship to the earth. Accordingly, cheap and simple storage of solar-energy-produced power for use during the intervals when there is an absence of solar radiations is one of the most important considerations in the exploitation of this form of energy. It is, therefore, the primary object of this invention to provide a storage system for use in connection with the utilization of solar energy.

Figure 1 illustrates schematically the energy cycles employed in the subject invention.

Figure 2 shows a specific embodiment of a power plant used for generating electrical energy from a primary solar energy source.

Figures 3 and 4 are fragmentary views of the boiler-tube element from an illustrative solar boiler.

Because the problem of power storage in solar energy systems is important, the prior art workers have devoted considerable time to the development of storage devices. In converting solar energy into potential energy, such techniques as the elevation of water, and the electrolysis of water with the subsequent storage of hydrogen and oxygen, as well as storage of heat energy in the form of heat of fusion or sensible heat, are employed. Because these techniques for storing power have economic disadvantages, it is more desirable to employ storage expedients which rely on more conventional principles.

According to the instant invention, solar energy can be accumulated and stored for use during periods when sunlight is not available by the storage system of this invention. Referring to Figure 1, wherein is presented schematically the basic concepts of this invention, it is seen that, in this system, solar energy is converted to steam energy by solar boiler 10 which may be of any suitable design, such as a parabolic reflector having a finned-tube heat exchanger at its axis. A plurality of such boilers mounted in parallel is normally required for economical operation. The steam from solar boiler 10 passes through line 12 to a prime mover such as steam turbine 13. After the energy from this working medium has been expended, it is exhausted from steam turbine 13 and is transferred to condenser 14. From condenser 14 the steam condensate passes to reservoir 16 through line 17. The condensate remains in the reservoir until it is recycled through line 18 by pump 19, and returned to solar boiler 10 by means of line 20 for reconversion into steam. An economizer feature may be provided in this steam cycle by employing the cool condensate as a heat-transfer medium (shown by dotted lines) in heat exchanger 25 where it is used to cool the compressed gases which are employed as the working medium in the second cycle of the power-generator system of this invention. Steam turbine 13 is employed as the prime mover for operating gas compressor 21. The inlet gas, which is fed into compressor 21, is withdrawn from low-pressure reservoir 22 to line 23. Compressor 21 compresses the gaseous working medium and delivers it through line 24, heat exchanger 25 and line 26 to high-pressure reservoir 27. A portion of the high-pressure gas remains in high-pressure reservoir 27 for use during the intermittent periods when solar radiations are not available for the generation of power. The remainder of the high-pressure gaseous working medium is transferred through line 28 to air motor 29. In operating the air motor, the pressure of the working medium is diminished and in this relatively low pressure state returns to low-pressure reservoir 22 through line 30 to recommence the cycle. In the illustrated embodiment, air motor 29 is connected to electrical generator 31 which produces electric power for distribution to consumers through power lines 32. It can, however, be employed as a prime mover for driving other types of machinery.

In order for the objectives of the instant invnetion to be effectuated, it is necessary that gas reservoirs 22 and 27 have a large capacity in order to make the process economically feasible. Such storage facilities are conveniently located in various geographical positions in the form of abandoned mines, wells, caverns, and the like. These storage facilities can be natural or man-made, such as storage facilities prepared by the mining or leaching of minerals from natural subterranean deposits. Although storage means of this nature are preferred, it is also possible to fabricate surface storage facilities of sufficient capacity for use in the instant invention.

The instant invention will be more clearly understood by referring to Figure 2 wherein is shown a complete specific embodiment of the instant invention. Utilizing the process presented in Figure 2, the mirror of solar boiler 40 having an output of $10 \times 10^6$ B.t.u./day, is constructed of flat plates of mirror, 6" x 6", placed on a parabolic surface constructed of reinforced concrete. This concrete base is 150 feet long and 50 feet across at its open face, and has a focal point three feet from the surface of the mirror. A single pipe, such as that illustrated in Figures 3 and 4, in which steam is generated is positioned along the focal point with its center line coinciding with a line through the axis of the parabolic surface, and parallel to the mirror. The pipe is made of stainless steel tubing having an outside diameter of 2 inches and a wall thickness of 0.18 inch. The pipe is provided with conical fins which have an outside diameter of 6 inches, are inclined 2 inches from perpendicular at their outside edges, and spaced at 2-inch intervals along the pipe. Water is fed at the average rate of 8080 lbs./day. Employing an inlet temperature of 300° F., and a pressure of 460 p.s.i.a., steam at 950° F. and 450 p.s.i.a. is generated. This steam is employed to operate an 80 hp., single-stage steam turbine, 42.

The saturated exhaust steam at a temperature of 101.7° F. and 1 p.s.i.a. is condensed by indirect heat exchange in condenser 43 and eventually transferred to water storage facility 44B for re-use in the steam cycle. The water in storage facility 44A, which remains substantially at a constant temperature of 65° F., is employed as the heat-transfer medium for condensing the exhaust steam. In this cooling service water is pumped through condenser 43 and discharged into storage facility 44B at a temperature of about 100° F. In being re-employed in the steam cycle, the water from storage facility 44B is transferred to storage facility 44A. In the transfer process the water is cooled by direct heat exchange with the subterranean geological formation. To effect this cooling, flow is regulated by means of a valve 44C positioned in the transfer line. The water is pumped through compressor-heat exchanger 45, which is a tubular, single-pass heater having 300 square feet of surface area with a "U" coefficient of 500 in the compressor cycle and heats the water to the desired inlet temperature while being maintained at a selected pressure. In this heater the gas passes outside the tube bundle.

Steam turbine 42 is connected by direct drive to single stage gas compressor 46.

The working medium in the gas cycle is methane which is pumped from leached-out salt cavern 47 which is used as the low-pressure reservoir. This cavern has the capacity to hold 640,000 cubic feet, at 50 p.s.i.a., of methane. The methane is pumped through compressor 46 and cooled in heat exchanger 45 to produce, as a latent source of energy, methane at a pressure of 500 p.s.i.a. and a temperature of 65° F. Employing this mechanical arrangement, 9500 pounds/day of methane can be introduced into a second leached-out salt cavern 48, which is used as the high-pressure reservoir. This cavern has the capacity to store 64,000 cubic feet, at 500 p.s.i.a., of methane. This provides a 10-day reserve for the continuous operation of a 30-horsepower, isothermally-operated, piston-driven gas motor 49. In this instance, a gas motor designed to give high heat transfer from surrounding media (air or hot water) for substantially isothermal operation is used.

The heat required to carry out the preferred isothermal operation is derived from the steam condensate which is initially sent to water storage facility 44B. In this heat transfer process, the water is cooled and discharged into storage facility 44A for use as above noted.

In operating conventional electrical generator 50, a net output of 435 kilowatt hours/day can be continuously generated. The methane exhausted from gas motor 49 is returned to the low-pressure reservoir 47 for re-use in the cycle.

By employing steam to operate the turbine in the steam cycle, and a non-liquefiable gas as the working medium in the compressor cycle, a high heat efficiency is obtained. In order to provide the high heat required for the suitable generation of steam, collectors which optically concentrate the sun's rays are employed. Although paraboloidal mirrors can be used if very high temperatures are desired, it is preferred, for the generation of steam at the relatively medium temperatures required in the power generation system of this invention, to use a cylindrical mirror with a nearly parabolic or "trough" cross-section. In fabricating the optical concentrators, a large number of small, flat mirrors are cemented to a suitable parabolic form fabricated from reinforced concrete, aluminum, redwood or other suitable materials of construction. The tubular collectors are located in the focal plane of the concentrator.

In fabricating the collector tubes, stainless steel is preferred as the material of construction. However, other materials such as high-alloy steels, aluminum, copper, and combinations thereof can be used. In the interest of economy, concentrators with one axis of rotation can be used. With this type, the collector is oriented north-south with the collector rotating with a uniform velocity from east to west. It is preferred, in order to obtain a normal incidence of the sun's rays on the opening of the concentrator, to use concentrators with two separate axes of rotation. One rotation corresponds to the apparent daily path of the sun and the other rotation corresponds to the annual change of the solar coordinates. Because concentrator-collector combinations of these types are described in the art, reference is made to such works as Proceedings, World Symposium on Applied Solar Energy, pages 43–61, 81–101, Stanford Research Institute, 1956.

The input solar energy in the steam cycle is collected and utilized at high, efficient energy levels for the operation of a steam engine. For satisfactory operation, the solar boiler should deliver sufficient steam at a temperature of 900°–1000° F. at a pressure of about 250–500 p.s.i.a. to operate a conventional steam turbine having a power output of 50 to 200 horsepower. Conventional steam turbines can be used, the size of which will depend upon the particular installation. Generally, however, turbines having an output of 75 to 100 horsepower are satisfactory. The output size, of course, will depend upon the size of the compressor employed in the compressor cycle. In a system of this nature it is preferred that a highly efficient, corrosion-resistant turbine be used, e.g., a marine type.

Mechanically coupled to the steam turbine is the compressor unit of the compressor cycle. For this service it is necessary to employ conventional compressors of sufficient capacity to effect the compression of sufficient quantities of gas to provide not only a continuous flow of the working medium, but also enough to build up a sufficient pressure in the high-pressure reservoir to insure the continuous operation of the gas-engine prime mover. Accordingly, the selected compressor will depend upon the design installation and type of air engine used. For an electrical power plant operation, the compressor should be sized to obtain a continuous flow of gas at a pressure of 250 to 1000 p.s.i.a. from an initial supply at 15 to 100 p.s.i.a. at a capacity of 5000 to 10,000 cubic feet/hour. Other installations, however, will require compressors having other capacities.

Although steam is used as the working medium in the steam cycle, non-liquefiable gases other than methane can be used in the compressor cycle. The term non-liquefiable is intended to connote a condition wherein the selected medium is not liquid at storage conditions. Exemplary gases include but are not limited to natural gas, air, hydrogen, nitrogen, helium, carbon dioxide and others.

The compressed gas in the compressor cycle is employed as motive power in the operation of an expansive-working air engine. In this type of air engine the compressed gas is admitted to the cylinder during only a part of the stroke, and is then cut off and the stroke completed by the expansive force of the air. Operation of this type of engine employing isothermal expansion is advantageous (Heat-Power Engineering, vol. 1, Barnard, et al., Wiley, 1926, p. 148). Accordingly, it is preferred for the purposes of this invention that isothermal operation be employed. If desired, preheating of the compressed gas working medium can be used. The air engine used as the prime mover in the compressor cycle is of conventional design. Examples of such engines are described by Peele in Compressed Air Plant, Wiley, 1930, in chap. XVI. It is to be understood that although the term "air engine" is employed in the appended claims, as noted above gases other than air can be utilized as the motive power for the operation of the engine.

The power output of the gas engine will depend upon the service in which the prime mover is used. For use in power generation in order to provide 25 to 100 kwh., a 15 to 60 H.P. turbine is used.

To provide high-capacity storage systems, large-volume, natural reservoirs are used. Although abandoned mines, porous subterranean stratum, or well-bores can be used, it is preferred that caverns mechanically mined in salt formations be used for the high-pressure and low-pressure reservoirs. For additional details on suitable natural reservoirs reference is made to the National Petroleum Council report published in March 1957 (Petroleum Week, March 22, 1957). For suitable operation, the high-pressure reservoir should have a capacity of 50,000 to 100,000 ft.$^3$ and operate about 500 p.s.i. The low-pressure reservoir should have a capacity of 500,000 to 1,000,000 ft.$^3$ and operate at about 50 p.s.i. to insure continuous operation. These values are for 435 kwh./day output.

Although the foregoing discussion has been directed to an expedient for storing energy derived from the sun for the time of interruption of sunshine, the instant invention has application as a storage means for use in a machine operated by other sources of energy which are naturally derived but are intermittent in duration. For example, windmills could be employed in certain locations as the prime mover for driving the compressor employed in the compressor cycle. Tidal power derived from the alternate rise and fall of the surface of the ocean, and of gulfs, bays, rivers, etc. connected with the ocean, can also be stored in the above-described manner. This type of energy will be referred to in the following claims as "naturally-derived transient energy intermittent in duration."

It, therefore, will be apparent to those skilled in this art that modifications and variations can be made employing the principles of this invention, which are illustrated by the foregoing specific example, without departing from the scope of the invention. Accordingly, the subject invention is limited only by the definition of the invention set forth in the appended claims.

I claim:
1. A power generating assembly for the continuous generation of mechanical energy from solar energy which consists of a solar energy conversion system comprising a solar boiler having a feedwater inlet and a steam outlet to gather energy from the sun and apply said energy to convert water into steam at an elevated temperature and pressure, a prime mover and means for transferring said steam to said prime mover, a condenser to condense the exhaust steam of said prime mover and means for transferring said exhaust steam from said prime mover to said condenser, a hot-water reservoir, a cold-water reservoir, means connecting said condenser, hot-water reservoir, and cold-water reservoir serially in the order stated, for the passage of water therethrough, and means for transferring condensate from said condenser to said hot-water reservoir; and a compressor system including a non-liquefiable gas, a compressor means driven by said prime mover for compressing said gas, a heat exchanger, a high-pressure storage reservoir for said gas, a gas motor, a low-pressure storage reservoir for said gas, said compressor means, heat exchanger, high-pressure reservoir, motor, and low-pressure reservoir being serially connected in the order stated for the passage of said gas through said compressor system; said heat exchanger also being connected between the feedwater inlet to said solar boiler and said cold-water reservoir for the passage of water from said cold-water reservoir through said heat exchanger to said boiler, so that gas leaving said compressor means is cooled and the boiler feedwater is heated, and means for transferring water from said hot-water reservoir to said gas motor and from said gas motor to said cold-water reservoir, said water giving up heat in said gas motor to achieve substantially isothermal operation of said gas motor; and said high-pressure reservoir having capacity sufficient to operate said gas motor during extended periods of insufficient solar energy.

2. A power-generating assembly for the continuous generation of mechanical energy from solar energy which consists of a solar energy conversion system comprising a solar boiler having a feedwater inlet and a steam outlet to gather energy from the sun and apply said energy to convert water into steam at an elevated temperature and pressure, a prime mover and means for transferring said steam to said prime mover, a condenser to condense the exhaust steam of said prime mover and means for transferring said exhaust steam from said prime mover to said condenser, a water reservoir, means for transferring condensate from said condenser to said reservoir, and means for transferring feedwater from said reservoir to said condenser to cool said condenser and heat said feedwater; and a compressor system including a non-liquefiable gas, a compressor means driven by said prime mover for compressing said gas, a heat exchanger, a high-pressure storage reservoir for said gas, a gas motor, a low-pressure storage reservoir for said gas, said compressor means, heat exchanger, high-pressure reservoir, motor, and low-pressure reservoir being serially connected in the order stated for the passage of said gas through said compressor system; said heat exchanger also being connected between the feedwater inlet to said solar boiler and said condenser for the passage of feedwater from said condenser through said heat exchanger to said boiler, so that gas leaving said compressor means is cooled and the boiler feedwater is heated; and said high-pressure reservoir having capacity sufficient to operate said gas motor during extended periods of insufficient solar energy.

3. An apparatus according to claim 2 including a valve-control feedwater-bypass conduit communicating between the feedwater inlet of the solar boiler and the water reservoir.

References Cited in the file of this patent
UNITED STATES PATENTS

| | | |
|---|---|---|
| 1,002,768 | Shuman | Sept. 5, 1911 |
| 1,231,051 | Nordberg | June 26, 1917 |
| 1,301,614 | Snyder | Apr. 22, 1919 |
| 1,386,781 | Harvey | Aug. 9, 1921 |
| 1,769,457 | Powell | July 1, 1930 |
| 1,785,651 | Romagnoli | Dec. 16, 1930 |
| 2,137,139 | Keller | Nov. 15, 1938 |
| 2,303,146 | Thompson | Nov. 24, 1942 |
| 2,475,701 | Eaton | July 12, 1949 |
| 2,632,995 | Noe | Mar. 31, 1953 |

FOREIGN PATENTS

| | | |
|---|---|---|
| 729,151 | Germany | Dec. 10, 1942 |
| 708,552 | Great Britain | May 5, 1954 |